United States Patent
Saka

(10) Patent No.: US 9,415,380 B2
(45) Date of Patent: Aug. 16, 2016

(54) METHOD FOR MANUFACTURING CATALYTIC CRACKING CATALYST FOR HYDROCARBON OIL

(71) Applicant: COSMO OIL CO., LTD., Minato-ku, Tokyo (JP)

(72) Inventor: Yuji Saka, Satte (JP)

(73) Assignee: COSMO OIL CO., LTD., Tokyo (JP)

( * ) Notice: Subject to any disclaimer, the term of this patent is extended or adjusted under 35 U.S.C. 154(b) by 0 days.

(21) Appl. No.: 14/772,165

(22) PCT Filed: Mar. 17, 2014

(86) PCT No.: PCT/JP2014/057074
§ 371 (c)(1),
(2) Date: Sep. 2, 2015

(87) PCT Pub. No.: WO2014/148416
PCT Pub. Date: Sep. 25, 2014

(65) Prior Publication Data
US 2016/0008796 A1    Jan. 14, 2016

(30) Foreign Application Priority Data

Mar. 22, 2013  (JP) ................................ 2013-059339

(51) Int. Cl.
| | | |
|---|---|---|
| *B01J 29/80* | (2006.01) | |
| *B01J 29/00* | (2006.01) | |
| *C10G 11/05* | (2006.01) | |
| *B01J 23/847* | (2006.01) | |
| *B01J 21/16* | (2006.01) | |
| *B01J 29/08* | (2006.01) | |
| *B01J 29/83* | (2006.01) | |
| *B01J 37/00* | (2006.01) | |

(52) U.S. Cl.
CPC ............... *B01J 29/005* (2013.01); *B01J 21/16* (2013.01); *B01J 23/8472* (2013.01); *B01J 29/084* (2013.01); *B01J 29/83* (2013.01); *B01J 37/0045* (2013.01); *C10G 11/05* (2013.01); *B01J 2229/42* (2013.01); *C10G 2300/305* (2013.01); *C10G 2400/02* (2013.01)

(58) Field of Classification Search
None
See application file for complete search history.

(56) References Cited

U.S. PATENT DOCUMENTS

| | | | | | |
|---|---|---|---|---|---|
| 4,874,899 A | * | 10/1989 | Hoelderich | ............. | C07C 45/59 568/309 |
| 5,179,054 A | * | 1/1993 | Schipper | .................. | B01J 33/00 502/65 |
| 5,238,676 A | * | 8/1993 | Roth | .................. | B01D 53/8628 423/713 |
| 5,258,114 A | * | 11/1993 | Aufdembrink | .... | B01D 53/8628 208/113 |
| 5,264,203 A | * | 11/1993 | Beck | .................. | B01D 53/8628 423/703 |
| 5,958,818 A | * | 9/1999 | Demmel | .................. | B01J 21/16 502/208 |
| 2015/0209771 A1 | * | 7/2015 | Saka | ........................ | B01J 29/80 208/114 |

FOREIGN PATENT DOCUMENTS

| | | |
|---|---|---|
| JP | 2002-515329 A | 5/2002 |
| JP | 2009-262127 A | 11/2009 |
| JP | 2010-247146 A | 11/2010 |
| JP | 2012-61408 A | 3/2012 |
| JP | 2012-61409 A | 3/2012 |
| JP | 2012-170855 A | 9/2012 |
| JP | 20120225009 | * 10/2012 |

OTHER PUBLICATIONS

International Search Report, issued in PCT/JP2014/057074, dated May 13, 2014.
Written Opinion of the International Searching Authority, issued in PCT/JP2014/057074, dated May 13, 2014.

* cited by examiner

*Primary Examiner* — Melvin C Mayes
*Assistant Examiner* — Colette Nguyen
(74) *Attorney, Agent, or Firm* — Birch, Stewart, Kolasch & Birch, LLP

(57) ABSTRACT

A method for producing a catalyst for catalytic cracking of a hydrocarbon oil easily produces a catalyst for catalytic cracking of a hydrocarbon oil that exhibits high cracking activity with respect to a heavy hydrocarbon oil, and can produce a gasoline fraction having a high octane number in high yield. The method includes preparing an aqueous slurry that includes 20 to 50 mass % of a zeolite having a sodalite cage structure, 10 to 30 mass % (on a $SiO_2$ basis) of a silica sol, 0.1 to 21 mass % (on an $Al_2O_3 \cdot P_2O_5$ basis) of mono aluminum phosphate, and 5 to 65 mass % of a clay mineral on a solid basis, aging the aqueous slurry for 5 to 200 minutes, and spray-drying the aqueous slurry.

1 Claim, No Drawings

_US 9,415,380 B2_

METHOD FOR MANUFACTURING CATALYTIC CRACKING CATALYST FOR HYDROCARBON OIL

TECHNICAL FIELD

The present invention relates to a method for producing a catalyst for catalytic cracking of a hydrocarbon oil.

BACKGROUND ART

In recent years, it has been considered to be important to elevate awareness of global environmental issues, and take measures against global warming, and it has been desired to clean automotive exhaust gas due to its effects on the environment. It is known that the capability to clean automotive exhaust gas is affected by the exhaust gas purification performance of automobiles and the composition of gasoline. In particular, the petroleum refining industry is required to provide high-quality gasoline.

Gasoline is produced by blending a plurality of gasoline blend stocks obtained by a crude oil refining process. In particular, a gasoline fraction obtained by subjecting a heavy hydrocarbon oil to a fluid catalytic cracking reaction (hereinafter appropriately referred to as "FCC gasoline") is incorporated in gasoline in large quantities, and considerably affects the quality of gasoline.

The heavy hydrocarbon oil catalytic cracking reaction is a reaction that converts a low-quality heavy oil obtained by a petroleum refining process into a light hydrocarbon oil through catalytic cracking. When producing FCC gasoline, hydrogen, coke, liquid petroleum gas (LPG), light cycle oil (LCO) (i.e., middle distillate), as well as heavy cycle oil (HCO) and slurry oil (SLO) (i.e., heavy distillate) are produced as by-products.

Therefore, a fluid catalytic cracking catalyst (hereinafter appropriately referred to as "FCC catalyst") has been desired that exhibits high cracking activity with respect to a heavy hydrocarbon oil, increases the yield of FCC gasoline, can produce high-quality FCC gasoline having a high octane number, and can efficiently produce FCC gasoline.

In recent years, it has become necessary to subject a heavy hydrocarbon oil having a high heavy metal (e.g., vanadium and nickel) content and a high residual carbon content to fluid catalytic cracking along with the use of heavy low-quality crude oil.

If vanadium is deposited on the FCC catalyst, the structure of the zeolite that is used as the active component of the FCC catalyst is destroyed, whereby the activity of the catalyst significantly deteriorates, and the amount of hydrogen/coke produced increases. As a result, the selectivity of gasoline (i.e., the yield of FCC gasoline) decreases, for example.

If nickel is deposited on the surface of the FCC catalyst, a dehydrogenation reaction is promoted, whereby the amount of hydrogen/coke produced increases. As a result, the selectivity of gasoline (i.e., the yield of FCC gasoline) decreases, for example.

Development of a catalyst that exhibits excellent cracking activity has been desired in order to deal with the use of heavy low-quality crude oil. For example, the applicant of the present application proposed an FCC catalyst that includes phosphorus (see Patent Document 1 (JP-A-2010-247146), for example).

RELATED-ART DOCUMENT

Patent Document

Patent Document 1: JP-A-2010-247146

SUMMARY OF THE INVENTION

Technical Problem

The inventor of the invention conducted extensive studies in order to solve the above technical problem, and found that it is possible to achieve high-degree cracking of a heavy hydrocarbon oil, and produce a gasoline fraction having a high octane number in high yield by utilizing a catalytic cracking catalyst that includes 20 to 50 mass % of a zeolite having a sodalite cage structure, 10 to 30 mass % (on a $SiO_2$ basis) of silicon derived from a silica sol, 0.1 to 21 mass % (on an $Al_2O_3.P_2O_5$ basis) of phosphorus and aluminum derived from mono aluminum phosphate, and 5 to 65 mass % of a clay mineral.

A catalytic cracking catalyst that exhibits higher cracking activity with respect to a heavy hydrocarbon oil, and can produce a gasoline fraction having a higher octane number in higher yield has been desired.

In view of the above situation, an object of the invention is to provide a method that can easily produce a catalyst for catalytic cracking of a hydrocarbon oil that exhibits high cracking activity with respect to a heavy hydrocarbon oil, and can produce a gasoline fraction having a high octane number in high yield.

Solution to Problem

The inventor conducted further studies in order to solve the above technical problem. As a result, the inventor found that a catalytic cracking catalyst having the desired properties can be easily produced by preparing an aqueous slurry that includes specific amounts of the above catalytic cracking catalyst raw material components, aging the aqueous slurry for 5 to 200 minutes, and spray-drying the aqueous slurry. This finding has led to the completion of the invention.

According to one aspect of the invention, a method for producing a catalyst for catalytic cracking of a hydrocarbon oil includes preparing an aqueous slurry that includes 20 to 50 mass % of a zeolite having a sodalite cage structure, 10 to 30 mass % (on a $SiO_2$ basis) of a silica sol, 0.1 to 21 mass % (on an $Al_2O_3.P_2O_5$ basis) of mono aluminum phosphate, and 5 to 65 mass % of a clay mineral on a solid basis, aging the aqueous slurry for 5 to 200 minutes, and spray-drying the aqueous slurry.

Advantageous Effects of the Invention

One aspect of the invention can thus provide a method that can easily produce a catalyst for catalytic cracking of a hydrocarbon oil that exhibits high cracking activity with respect to a heavy hydrocarbon oil, and can produce a gasoline fraction having a high octane number in high yield.

DESCRIPTION OF EMBODIMENTS

A method for producing a catalyst for catalytic cracking of a hydrocarbon oil (hereinafter may be referred to as "production method") according to one embodiment of the invention includes preparing an aqueous slurry that includes 20 to 50 mass % of a zeolite having a sodalite cage structure, 10 to 30 mass % (on a SiO$_2$ basis) of a silica sol, 0.1 to 21 mass % (on an Al$_2$O$_3$.3P$_2$O$_5$ basis) of mono aluminum phosphate, and 5 to 65 mass % of a clay mineral on a solid basis (on a dry basis), aging the aqueous slurry for 5 to 200 minutes, and spray-drying the aqueous slurry. Note that the catalyst for catalytic cracking of a hydrocarbon oil may be hereinafter referred to as "catalytic cracking catalyst".

Zeolite Having Sodalite Cage Structure

The term "zeolite having a sodalite cage structure" used herein refers to a zeolite having a structure that is formed by truncating each vertex of a three-dimensional regular octahedral crystal structure that includes aluminum and a silicon tetrahedron as basic units, is formed by allowing aluminum or silicon to share vertex oxygen, and has a pore formed by a tetrakaidecahedral crystal structure defined by a four-membered ring, a six-membered ring, and the like (i.e., sodalite cage structure). A zeolite that differs in pore structure, framework density, and channel structure is formed due to a change in position and method by which the sodalite cages are bonded.

The zeolite having a sodalite cage structure may be one or more zeolites selected from sodalite, A zeolite, EMT, X zeolite, Y zeolite, an ultra-stable Y zeolite, and the like. Among these, an ultra-stable Y zeolite is preferable.

The ultra-stable Y zeolite is synthesized using Y zeolite as a starting material. The ultra-stable Y zeolite shows only a small deterioration in crystallinity as compared with Y zeolite. The ultra-stable Y zeolite is normally produced by subjecting Y zeolite to a high-temperature water vapor treatment several times, and optionally treating the resulting product using a mineral acid (e.g., hydrochloric acid), a base (e.g., sodium hydroxide), a salt (e.g., calcium fluoride), or a chelating agent (e.g., ethylenediaminetetraacetic acid).

The ultra-stable Y zeolite obtained using the above method may be used in a state in which the ultra-stable Y zeolite is ion-exchanged with a cation selected from hydrogen, ammonium, and a polyvalent metal. A heat-shock crystalline aluminosilicate zeolite having better stability (see Japanese Patent No. 2544317) may be used as the ultra-stable Y zeolite.

It is preferable that the ultra-stable Y zeolite (I) have a molar ratio SiO$_2$/Al$_2$O$_3$ (in a bulk state) determined by chemical composition analysis of 4 to 15 (more preferably 5 to 10), (II) have a unit cell dimension of 24.35 to 24.65 Å (more preferably 24.40 to 24.60 Å), and (III) have a molar ratio of the number of Al atoms that form the zeolite framework to the total number of Al atoms included in the zeolite of 0.3 to 1.0 (more preferably 0.4 to 1.0).

The ultra-stable Y zeolite basically has the same crystal structure as that of natural faujasite, and is represented by the following compositional formula (oxide).

(0.02 to 1.0)R$_{2/m}$O.Al$_2$O$_3$.(5 to 11)SiO$_2$.(5 to 8)H$_2$O wherein R is an alkali metal ion or an alkaline-earth metal ion (e.g., Na or K), and m is the valence of R.

The molar ratio SiO$_2$/Al$_2$O$_3$ of the zeolite (in a bulk state) determined by chemical composition analysis (see (I)) represents the acid strength of the resulting catalytic cracking catalyst. The resulting catalytic cracking catalyst exhibits higher acid strength as the molar ratio SiO$_2$/Al$_2$O$_3$ increases. When the molar ratio SiO$_2$/Al$_2$O$_3$ is 4 or more, an acid strength required to catalytically crack a heavy hydrocarbon oil can be obtained, and the cracking reaction can be advantageously effected. When the molar ratio SiO$_2$/Al$_2$O$_3$ is 15 or less, the resulting catalytic cracking catalyst exhibits high acid strength (i.e., the desired number of acids can be obtained), and it is possible to easily ensure cracking activity with respect to a heavy hydrocarbon oil.

The molar ratio SiO$_2$/Al$_2$O$_3$ of the zeolite (in a bulk state) (see (III)) may be determined by inductively coupled plasma (ICP) spectrometry.

The unit cell dimension of the zeolite (see (II)) represents the size of the unit cell of the zeolite. When the unit cell dimension is 24.35 Å or more, the number of Al atoms is appropriate for cracking a heavy oil, and the cracking reaction can be advantageously effected. When the unit cell dimension is 24.65 Å or less, a collapse in zeolite crystals can be easily suppressed, and a decrease in cracking activity of the catalyst can be easily suppressed.

The unit cell dimension of the zeolite (see (II)) may be determined using an X-ray diffractometer (XRD).

If the number of Al atoms that form the zeolite framework is too large, the number of Al$_2$O$_3$ particles that are removed from the zeolite framework increases, and the catalytic cracking reaction may not proceed due to the absence of a strong acid site. When the molar ratio of the number of Al atoms that form the zeolite framework to the total number of Al atoms included in the zeolite (see (III)) is 0.3 or more, the above phenomenon can be avoided. When the molar ratio of the number of Al atoms that form the zeolite framework to the total number of Al atoms included in the zeolite is close to 1.0, most of the Al atoms included in the zeolite are incorporated in the unit cell of the zeolite, and effectively contribute to development of a strong acid site.

The molar ratio of the number of Al atoms that form the zeolite framework to the total number of Al atoms included in the zeolite (see (III)) may be calculated from the molar ratio SiO$_2$/Al$_2$O$_3$ (in a bulk state) determined by chemical composition analysis (see (I)) and the unit cell dimension (see (II)) using the following expressions (A) to (C). Note that the expression (A) is described in H. K. Beyer et al., J. Chem. Soc., Faraday Trans. 1, (81), 2899 (1985).

$$N_{Al} = (a0 - 2.425)/0.000868 \quad \text{(A)}$$

where, $N_{Al}$ is the number of Al atoms per unit cell, a0 is the unit cell dimension (nm), the value "2.425" is the unit cell dimension (nm) when all of the Al atoms included in the framework of the unit cell have been eliminated from the framework, and the value "0.000868" is an experimentally calculated value, and represents the slope of a linear expression (a0=0.000868$N_{Al}$+2.425).

$$(Si/Al) = (192 - N_{Al})/N_{Al} \quad \text{(B)}$$

where, (Si/Al) is the calculated molar ratio SiO$_2$/Al$_2$O$_3$ of the zeolite (in a bulk state), $N_{Al}$ is the number of Al atoms per unit cell calculated using the expression (A), and the value "192" is the total number of Si atoms and Al atoms per unit dimension of Y zeolite.

Molar ratio of number of Al atoms that form zeolite framework to total number of Al atoms included in zeolite=(molar ratio "SiO$_2$/Al$_2$O$_3$" of zeolite (in bulk state) determined by chemical composition analysis)/(Si/Al)  (C)

where, (Si/Al) is the molar ratio SiO$_2$/Al$_2$O$_3$ of the zeolite (in a bulk state) calculated using the expression (B).

The production method according to one embodiment of the invention provides the desired high cracking activity by utilizing the zeolite having a sodalite cage structure.

The content of the zeolite having a sodalite cage structure in the aqueous slurry used in connection with the production method according to one embodiment of the invention is 20 to 50 mass %, preferably 30 to 45 mass %, and more preferably 35 to 45 mass % (on a solid basis).

When the content of the zeolite having a sodalite cage structure is 20 mass % or more, the resulting catalytic cracking catalyst exhibits the desired cracking activity. When the content of the zeolite having a sodalite cage structure is 50 mass % or less, the desired amounts of the clay mineral, and the component derived from a binder (e.g., silicon derived from a silica sol, and phosphorus and aluminum derived from mono aluminum phosphate) can be incorporated in the resulting catalytic cracking catalyst, and a catalytic cracker can be advantageously operated while ensuring that the resulting catalytic cracking catalyst exhibits the desired strength and the desired bulk density.

Silica Sol

The aqueous slurry used in connection with the production method according to one embodiment of the invention includes 10 to 30 mass % (on a $SiO_2$ basis) of the silica sol (on a solid basis).

It is preferable that the silica sol used in connection with the production method according to one embodiment of the invention be a water-soluble silica sol.

Several types of silica sol are known. For example, a colloidal silica sol is classified as a sodium-type colloidal silica sol, a lithium-type colloidal silica sol, an acid-type colloidal silica sol, and the like. The production method according to one embodiment of the invention may utilize an arbitrary type of silica sol.

When producing the catalytic cracking catalyst on a commercial scale, a silica hydrosol obtained by reacting a diluted water glass aqueous solution with a sulfuric acid aqueous solution may be used, for example.

The concentration (on a $SiO_2$ basis) of the silica sol is not particularly limited as long as the silica sol is in the form of sol. For example, the concentration (on a $SiO_2$ basis) of the silica sol may be about 10 mass % to about 50 mass %.

The content (on a $SiO_2$ basis) of the silica sol in the aqueous slurry used in connection with the production method according to one embodiment of the invention is 10 to 30 mass %, preferably 15 to 30 mass %, and more 15 to 25 mass % (on a solid basis).

When the content (on a $SiO_2$ basis) of the silica sol in the aqueous slurry used in connection with the production method according to one embodiment of the invention is 10 mass % or more, the resulting catalytic cracking catalyst exhibits the desired strength, and it is possible to prevent an undesirable phenomenon such as scattering of the catalyst or mixing of the catalyst into the product oil. When the content (on a $SiO_2$ basis) of the silica sol in the aqueous slurry is 30 mass % or less, the resulting catalytic cracking catalyst exhibits improved catalytic performance corresponding to the amount of the silica sol, and it is advantageous from the economical point of view.

The catalytic cracking catalyst produced using the production method according to one embodiment of the invention normally includes silicon derived from the silica sol in the form of an oxide.

The silica sol functions as a binder when producing the catalytic cracking catalyst. The silica sol is heated and oxidized when producing the catalytic cracking catalyst. It is possible to improve formability during granulation (microparticle formation) of the zeolite and the clay mineral, and easily obtain a spherical catalytic cracking catalyst by utilizing the silica sol when producing the catalytic cracking catalyst. It is also possible to easily improve the fluidity and the wear resistance of the resulting catalytic cracking catalyst.

Mono Aluminum Phosphate

The aqueous slurry used in connection with the production method according to one embodiment of the invention includes 0.1 to 21 mass % a (on an $Al_2O_3.3P_2O_5$ basis) of phosphorus and aluminum derived from mono aluminum phosphate (on a solid basis).

Mono aluminum phosphate is a water-soluble acidic phosphate represented by $Al(H_2PO_4)_3$. Mono aluminum phosphate may also be referred to as aluminum monophosphate or aluminum biphosphate.

Mono aluminum phosphate is dehydrated by heating, and stabilized in the form of an oxide (aluminum phosphate oxide ($AlPO_4$)). Since mono aluminum phosphate is present as a polynuclear complex polymer in an aqueous solution, and includes a large amount of hydroxyl groups on its surface, mono aluminum phosphate exhibits a strong binding force as compared with other aluminum sources. Therefore, mono aluminum phosphate advantageously functions as a binder when producing the catalytic cracking catalyst.

The acidity of the catalytic cracking catalyst produced using the production method according to one embodiment of the invention changes due to phosphorus and aluminum derived from mono aluminum phosphate, and the cracking activity is improved.

Therefore, the catalytic cracking catalyst produced using the production method according to one embodiment of the invention that includes phosphorus and aluminum derived from mono aluminum phosphate exhibits the desired high cracking activity, and can produce a high-quality gasoline fraction having a high octane number.

The mono aluminum phosphate is not particularly limited. For example, mono aluminum phosphate having an $Al_2O_3.P_2O_5$ concentration of 30 to 95 mass % may be appropriately selected.

The $Al_2O_3.3P_2O_5$ concentration of mono aluminum phosphate may be calculated from the weight reduction ratio when mono aluminum phosphate is heated at 800° C. for 3 hours using a high-temperature furnace.

Mono aluminum phosphate may include impurities as long as the performance of the catalytic cracking catalyst produced using the production method according to one embodiment of the invention is not affected. For example, mono aluminum phosphate may include a metal (e.g., boron and magnesium) or an organic compound (e.g., lactic acid) in a ratio of 10 mass % or less.

The content (on an $Al_2O_3.3P_2O_5$ basis) of mono aluminum phosphate in the aqueous slurry used in connection with the production method according to one embodiment of the invention is 0.1 to 21 mass %, preferably 0.1 to 10 mass %, more preferably 0.5 to 10 mass %, and still more preferably 0.5 to 5 mass % (on a solid basis).

When the content (on an $Al_2O_3.3P_2O_5$ basis) of mono aluminum phosphate in the aqueous slurry is 0.1 mass % or more (on a solid basis), the resulting catalytic cracking catalyst exhibits improved cracking activity with respect to a hydrocarbon oil. When the content (on an $Al_2O_3.3P_2O_5$ basis) of mono aluminum phosphate in the aqueous slurry is 21 mass % or less, an improvement in catalytic performance corresponding to the amount of mono aluminum phosphate is achieved, and a high-quality gasoline fraction having a high octane number can be produced.

The silica sol and mono aluminum phosphate used in connection with the production method according to one embodiment of the invention are oxidized during heating performed when producing the catalyst, and are included in the catalytic cracking catalyst in the form of an oxide.

An alumina sol may be used as an additional binder when preparing the aqueous slurry when implementing the production method according to one embodiment of the invention, for example. In this case, the alumina sol is included in the granulated catalyst in the form of an oxide.

Examples of the alumina sol include a basic aluminum chloride ($[Al_2(OH)_nCl_{6-n}]_m$ (wherein $0<n<6$, and $m\leq10$)), an amorphous alumina sol, a pseudoboehmite-type alumina sol, a commercially available alumina sol, a solution prepared by dissolving gibbsite, bialite, boehmite, bentonite, or crystalline alumina in an acid solution, and the like. Among these, a basic aluminum chloride is preferable.

The alumina sol is dehydrated by heating, and stabilized in the form of an oxide.

It is preferable to set the molar ratio of the phosphorus atoms derived from mono aluminum phosphate to the silicon atoms derived from the silica sol (hereinafter may be appropriately referred to as "phosphorus/silicon molar ratio") in the aqueous slurry used in connection with the production method according to one embodiment of the invention to 0.01 to 0.75, and more preferably 0.01 to 0.35.

When the phosphorus/silicon molar ratio in the aqueous slurry is 0.01 or more, it is possible to obtain a catalytic cracking catalyst that exhibits higher cracking activity. When the phosphorus/silicon molar ratio in the aqueous slurry is 0.75 or less, it is possible to obtain a catalyst that can produce FCC gasoline having a higher octane number.

The phosphorus/silicon molar ratio can be controlled by adjusting the amounts of mono aluminum phosphate and the silica sol.

Clay Mineral

The aqueous slurry used in connection with the production method according to one embodiment of the invention includes 5 to 65 mass % of the clay mineral (on a solid basis).

Examples of the clay mineral include montmorillonite, kaolinite, halloysite, bentonite, attapulgite, bauxite, and the like.

When implementing the production method according to one embodiment of the invention, microparticles (fine particles) of a known inorganic oxide (e.g., silica, silica-alumina, alumina, silica-magnesia, alumina-magnesia, phosphorus-alumina, silica-zirconia, or silica-magnesia-alumina) that is normally used for a catalytic cracking catalyst may be used in combination with the clay mineral.

The content of the clay mineral in the aqueous slurry used in connection with the production method according to one embodiment of the invention is 5 to 65 mass %, preferably 5 to 60 mass %, and more preferably 10 to 60 mass % (on a solid basis).

When the content of the clay mineral in the aqueous slurry is 5 mass % or more (on a solid basis), the catalyst strength of the resulting catalytic cracking catalyst can be improved, and a catalytic cracker can be advantageously operated while maintaining the bulk density of the catalyst. When the content of the clay mineral in the aqueous slurry is 65 mass % or less (on a solid basis), a catalytic cracking catalyst that exhibits the desired cracking activity can be easily produced in the presence of the desired amount of binder by incorporating the zeolite having a sodalite cage structure and the binder (e.g., silica sol and mono aluminum phosphate) in the catalytic cracking catalyst in a given ratio.

When implementing the production method according to one embodiment of the invention, a rare-earth metal may be further added when producing the catalytic cracking catalyst to obtain a catalytic cracking catalyst that includes a rare-earth metal.

The rare-earth metal may be one or more rare-earth metals selected from scandium, yttrium, lanthanum, cerium, praseodymium, neodymium, samarium, gadolinium, dysprosium, holmium, and the like. Among these, lanthanum and cerium are preferable.

It is possible to suppress a situation in which the zeolite crystals collapse, and improve the durability of the catalyst by incorporating the rare-earth metal in the catalytic cracking catalyst.

The content (on an oxide basis) of the rare-earth metal in the catalytic cracking catalyst produced using the production method according to one embodiment of the invention is preferably 0 to 2 mass %, more preferably 0 to 1.5 mass %, and still more preferably 0.1 to 1.2 mass %.

When the content (on an oxide basis) of the rare-earth metal in the catalytic cracking catalyst produced using the production method according to one embodiment of the invention is within the above range, the catalytic cracking catalyst easily exhibits high cracking activity, and can produce a gasoline fraction having a high octane number.

When using the rare-earth metal when implementing the production method according to one embodiment of the invention, the rare-earth metal may be supported on the zeolite having a sodalite cage structure to obtain a zeolite having a metal-modified sodalite cage structure, and the aqueous slurry may be prepared using the zeolite having the metal-modified sodalite cage structure, for example.

Specifically, the zeolite having a sodalite cage structure in a dry state or a wet state may be subjected to an ion-exchange treatment using (or impregnated with) an aqueous solution that includes one type or two or more types of rare-earth metal compound (e.g., chloride, nitrate, sulfate, or acetate), and optionally heated to prepare a zeolite having a metal-modified sodalite cage structure (that supports the rare-earth metal), which may be mixed into the aqueous slurry, and subjected to the subsequent treatment.

When implementing the production method according to one embodiment of the invention, the rare-earth metal may be added (supported) by performing an ion-exchange washing treatment after aging and drying the aqueous slurry (described later), and performing an ion-exchange treatment using the rare-earth metal before drying the resulting microspheres.

In this case, the microspheres may be subjected to the ion-exchange treatment using an aqueous solution that includes one type or two or more types of rare-earth metal compound (e.g., chloride, nitrate, sulfate, or acetate), or may be impregnated with the aqueous solution, and optionally heated to obtain microspheres that support the rare-earth metal, which may be subjected to the subsequent treatment.

When implementing the production method according to one embodiment of the invention, a catalytic cracking catalyst that includes a metal other than the rare-earth metal may be produced by utilizing a metal other than the rare-earth metal when producing the catalytic cracking catalyst.

Preparation of Slurry

When implementing the production method according to one embodiment of the invention, the aqueous slurry may be prepared using an arbitrary method that mixes the components in a given ratio, and uniformly disperses the components.

Examples of the aqueous solvent used to prepare the aqueous slurry include water and a mixed solvent of water and a hydrophilic solvent. It is preferable to use water as the aqueous solvent.

For example, the aqueous slurry may be prepared by adding the silica sol to water, stirring the mixture to prepare a homogenous binder aqueous solution, adding mono aluminum phosphate, the zeolite having a sodalite cage structure, and the clay mineral to the binder aqueous solution, and mixing the mixture to obtain the desired homogenous aqueous slurry.

Alternatively, the aqueous slurry may be prepared by adding the silica sol and mono aluminum phosphate to water, mixing the mixture to prepare a homogenous binder aqueous solution, adding the zeolite having a sodalite cage structure and the clay mineral to the binder aqueous solution, and mixing the mixture to obtain the desired homogenous aqueous slurry.

Specifically, mono aluminum phosphate may be added when preparing the binder aqueous solution, or may be added together with the zeolite having a sodalite cage structure and the clay mineral. The advantageous effects of the invention can be achieved by adding mono aluminum phosphate in an arbitrary stage.

The aqueous slurry may also be prepared by adding the zeolite having a sodalite cage structure, the silica sol, mono aluminum phosphate, and the clay mineral to water at one time, and mixing the mixture to obtain the desired homogenous aqueous slurry.

It is preferable to stir (mix) the components after adding all of the components used to prepare the aqueous slurry to the aqueous solvent. The stirring (mixing) time is not particularly limited as long as each component is uniformly dispersed. The stirring (mixing) time is preferably 2 minutes or more, more preferably 5 minutes or more, and still more preferably 10 minutes or more.

The upper limit of the stirring (mixing) time is not particularly limited. Since the stirring effect is saturated when the mixture is stirred for too long a time, the stirring time is preferably set to 60 minutes or less, more preferably 45 minutes or less, and still more preferably 30 minutes or less.

It is possible to sufficiently bring mono aluminum phosphate and the zeolite into contact with each other by stirring the components for 2 minutes or more after adding all of the components used to prepare the aqueous slurry to the aqueous solvent. It is conjectured that the zeolite framework structure can be stabilized by allowing mono aluminum phosphate to be present around the zeolite.

A stirring (mixing) device used when preparing the aqueous slurry is not particularly limited as long as each component can be uniformly dispersed. Examples of the stirring (mixing) device include a propeller stirrer, a heating stirrer, a disperser, and the like. It is possible to sufficiently bring mono aluminum phosphate and the zeolite into contact with each other by stirring (mixing) the components after adding all of the components used to prepare the aqueous slurry to the aqueous solvent. It is conjectured that the zeolite framework structure can be stabilized by allowing mono aluminum phosphate to be present around the zeolite.

When implementing the production method according to one embodiment of the invention, the stirring speed, the stirring time, and the like employed when preparing the aqueous slurry by stirring (mixing) the components are appropriately adjusted so that an aqueous slurry in which each component is uniformly dispersed can be obtained.

It is preferable to prepare the aqueous slurry at a temperature of 10 to 80° C., more preferably 20 to 70° C., and still more preferably 25 to 65° C.

The solid content in the aqueous slurry is preferably 5 to 60 mass %, and more preferably 10 to 50 mass %. When the solid content in the aqueous slurry is within the above range, an appropriate amount of water is evaporated when drying the aqueous slurry (i.e., the aqueous slurry can be easily dried). Moreover, the aqueous slurry can be easily handled while preventing an increase in the viscosity of the aqueous slurry.

Aging

When implementing the production method according to one embodiment of the invention, the aqueous slurry prepared as described above is aged for 5 to 200 minutes.

The term "aging" used herein in connection with the production method according to one embodiment of the invention refers to allowing the aqueous slurry prepared as described above to stand for a given time until the aqueous slurry is spray-dried.

When implementing the production method according to one embodiment of the invention, the aqueous slurry is aged for 5 to 200 minutes, preferably 10 to 100 minutes, and more preferably 15 to 60 minutes.

When the aging time is 5 minutes or more, it is considered that interaction between the catalyst components included in the aqueous slurry proceeds sufficiently. When the aging time is 200 minutes or less, it is considered that interaction between the catalyst components proceeds efficiently, and a catalytic cracking catalyst that has the desired structure can be advantageously produced.

When implementing the production method according to one embodiment of the invention, the aging temperature is not particularly limited, but is preferably 10 to 80° C., more preferably 20 to 70° C., and still more preferably 25 to 65° C.

When implementing the production method according to one embodiment of the invention, the catalytic cracking catalyst may be produced using a batchwise production method or a continuous production method.

When producing the catalytic cracking catalyst using a batchwise production method, the aqueous slurry may be aged by allowing the aqueous slurry that has been prepared in a mixing vessel to stand for a given time inside or outside the mixing vessel, for example.

When producing the catalytic cracking catalyst using a continuous production method, the aqueous slurry may be aged by extracting the aqueous slurry that has been prepared in a mixing vessel from the bottom of the mixing vessel through a pipe while adjusting the length and the thickness of the pipe or the transfer speed of the aqueous slurry so that the aqueous slurry is transferred to the subsequent spray drying step over a given time, for example.

When producing a catalytic cracking catalyst, an aqueous slurry has been normally subjected to the subsequent step immediately after preparation in order to suppress a situation in which the aqueous slurry changes in properties (quality). Since the production method according to one embodiment of the invention ages the aqueous slurry for a given time, it is considered that interaction between the components proceeds, and a catalytic cracking catalyst that has a specific structure and exhibits the desired properties can be preliminarily prepared.

A catalytic cracking catalyst that exhibits excellent catalytic performance (e.g., high cracking activity with respect to a heavy hydrocarbon oil) may be obtained by spray-drying the aqueous slurry immediately after preparation without aging the aqueous slurry. However, it was surprising to find that a catalytic cracking catalyst that exhibits more excellent catalytic performance (e.g., higher cracking activity) can be obtained by aging the aqueous slurry for a given time, and then spray-drying the aqueous slurry. This finding has led to the completion of the invention.

Spray Drying

When implementing the production method according to one embodiment of the invention, the aqueous slurry that has been aged as described above is spray-dried.

Microspheres (catalyst or catalyst precursor) can be obtained by spray-drying the aqueous slurry that has been aged.

It is preferable to spray-dry the aqueous slurry using a spray dryer at a gas inlet temperature of 200 to 600° C. and a gas outlet temperature of 100 to 300° C.

It is preferable that the microspheres obtained by spray drying have a particle size of 20 to 150 µm and a water content of 5 to 30 mass %.

When the microspheres do not include excess alkali metals, soluble impurities, and the like, the microspheres may be used directly as the target catalytic cracking catalyst.

Note that the term "particle size" used herein in connection with the microspheres refers to a value measured in accordance with JIS Z 8815, and the term "water content" used herein in connection with the microspheres refers to a value determined by heating the microspheres at 800° C. for 3 hours using a heating furnace, and calculating a change is mass (i.e., water removal amount) due to heating.

When implementing the production method according to one embodiment of the invention, the microspheres obtained by drying the aqueous slurry may be subjected to a washing treatment and an ion-exchange treatment using a known method to remove excess alkali metals, soluble impurities, and the like derived from the raw materials.

The washing treatment may be performed using water or aqueous ammonia. The soluble impurity content can be reduced by washing the microspheres using water or aqueous ammonia.

The ion-exchange treatment may be performed using an aqueous solution of an ammonium salt such as ammonium sulfate, ammonium sulfite, ammonium hydrogen sulfate, ammonium hydrogen sulfite, ammonium thiosulfate, ammonium nitrite, ammonium nitrate, ammonium phosphinate, ammonium phosphonate, ammonium phosphate, ammonium hydrogen phosphate, ammonium dihydrogen phosphate, ammonium carbonate, ammonium hydrogen carbonate, ammonium chloride, ammonium bromide, ammonium iodide, ammonium formate, ammonium acetate, or ammonium oxalate. The alkali metal (e.g., sodium and potassium) content in the microspheres can be reduced by performing the ion-exchange treatment.

The washing treatment is normally performed before performing the ion-exchange treatment. Note that the ion-exchange treatment may be performed before performing the washing treatment as long as the washing treatment and the ion-exchange treatment can be performed without problems.

It is preferable to perform the washing treatment and the ion-exchange treatment until the alkali metal content and the soluble impurity content are reduced to a value equal to or less than the desired value. The catalytic activity can be advantageously improved by reducing the alkali metal content and the soluble impurity content to a value equal to or less than the desired value.

When implementing the production method according to one embodiment of the invention, it is preferable that the microspheres have an alkali metal content of 1.0 mass % or less, and more preferably 0.5 mass % or less, based on the dried catalyst, and have a soluble impurity content of 2.0 mass % or less, and more preferably 1.5 mass % or less, based on the dried catalyst.

It is preferable to dry the microspheres that have been subjected to the washing treatment and the ion-exchange treatment. In this case, the microspheres are preferably dried at 100 to 500° C. until the microspheres have a water content of 1 to 25 mass %.

The production method according to one embodiment of the invention can thus produce the desired catalytic cracking catalyst.

The production method according to one embodiment of the invention can thus easily produce a catalyst for catalytic cracking of a hydrocarbon oil that exhibits high cracking activity with respect to a heavy hydrocarbon oil, and can produce a gasoline fraction having a high octane number in high yield.

The catalytic cracking catalyst produced using the production method according to one embodiment of the invention includes 20 to 50 mass % of the zeolite having a sodalite cage structure, 10 to 30 mass % (on a $SiO_2$ basis) of silicon derived from the silica sol, 0.1 to 21 mass % (on an $Al_2O_3 \cdot 3P_2O_5$ basis) of phosphorus and aluminum derived from mono aluminum phosphate, and 5 to 65 mass % of the clay mineral (that are derived from each raw material).

The content of the zeolite having a sodalite cage structure in the catalytic cracking catalyst produced using the production method according to one embodiment of the invention is 20 to 50 mass %, preferably 30 to 45 mass %, and more preferably 35 to 45 mass %.

When the content of the zeolite having a sodalite cage structure is 20 mass % or more, the desired cracking activity can be achieved. When the content of the zeolite having a sodalite cage structure is 50 mass % or less, the desired amounts of the clay mineral, and the component derived from a binder (e.g., silicon derived from a silica sol, and phosphorus and aluminum derived from mono aluminum phosphate) can be incorporated in the granulated catalyst A, and a catalytic cracker can be advantageously operated while maintaining the strength and the bulk density of the resulting catalytic cracking catalyst.

The content (on a $SiO_2$ basis) of silicon derived from the silica sol in the catalytic cracking catalyst produced using the production method according to one embodiment of the invention is 10 to 30 mass %, preferably 15 to 30 mass %, and more preferably 15 to 25 mass %.

When the content (on a $SiO_2$ basis) of silicon derived from a silica sol is 10 mass % or more, the strength of the resulting catalytic cracking catalyst is maintained, and it is possible to prevent an undesirable phenomenon such as scattering of the catalyst or mixing of the catalyst into the product oil. When the content (on a $SiO_2$ basis) of silicon derived from a silica sol is 30 mass % or less, an improvement in catalytic performance corresponding to the amount of usage is achieved, and it is advantageous from the economical point of view.

Note that the catalytic cracking catalyst produced using the production method according to one embodiment of the invention normally includes silicon derived from the silica sol in the form of an oxide.

The content (on an $Al_2O_3 \cdot 3P_2O_5$ basis) of phosphorus and aluminum derived from mono aluminum phosphate in the catalytic cracking catalyst produced using the production method according to one embodiment of the invention is 0.1 to 21 mass %, preferably 0.1 to 10 mass %, more preferably 0.5 to 10 mass %, and still more preferably 0.5 to 5 mass %.

When the content of phosphorus and aluminum derived from mono aluminum phosphate is 0.1 mass % or more, the catalytic cracking catalyst exhibits improved cracking activity with respect to a hydrocarbon oil. When the content of phosphorus and aluminum derived from mono aluminum phosphate is 21 mass % or less, the catalytic cracking catalyst exhibits improved catalytic performance corresponding to the amount of mono aluminum phosphate, and a high-quality gasoline fraction having a high octane number can be produced.

Note that mono aluminum phosphate is dehydrated by heating, and stabilized in the form of an oxide (aluminum phosphate oxide ($AlPO_4$)). It is considered that mono aluminum phosphate is present in the catalytic cracking catalyst produced using the production method according to one embodiment of the invention in the form of an oxide.

The content of the clay mineral in the catalytic cracking catalyst produced using the production method according to one embodiment of the invention is 5 to 65 mass %, preferably 5 to 60 mass %, and more preferably 10 to 60 mass %.

When the content of the clay mineral is 5 mass % or more, the catalyst strength of the resulting catalytic cracking catalyst can be improved, and a catalytic cracker can be advantageously operated while maintaining the bulk density of the catalyst. When the content of the clay mineral is 65 mass % or less, the catalyst can be easily produced in the presence of the desired amount of binder while maintaining the intended cracking activity by incorporating the zeolite having a sodalite cage structure, and the component derived from the binder (e.g., silica derived from a silica sol, and phosphorus and aluminum derived from mono aluminum phosphate) in the catalyst in a given ratio.

The catalytic cracking catalyst produced using the production method according to one embodiment of the invention includes the rare-earth metal as an optional component. The content (on an oxide basis) of the rare-earth metal in the catalytic cracking catalyst is 0 to 2 mass %, preferably 0 to 1.5 mass %, and more preferably 0.1 to 1.2 mass %.

When the content (on an oxide basis) of the rare-earth metal in the catalytic cracking catalyst is within the above range, the catalytic cracking catalyst exhibits high cracking activity, and can produce a gasoline fraction having a high octane number.

The molar ratio (phosphorus/silicon molar ratio) of the phosphorus atoms derived from mono aluminum phosphate to the silicon atoms derived from the silica sol in the catalytic cracking catalyst produced using the production method according to one embodiment of the invention is preferably 0.01 to 0.75, and more preferably 0.01 to 0.35.

When the phosphorus/silicon molar ratio in the catalytic cracking catalyst is 0.01 or more, it is possible to easily obtain a catalytic cracking catalyst that exhibits higher cracking activity. When the phosphorus/silicon molar ratio in the catalytic cracking catalyst is 0.75 or less, it is possible to easily produce FCC gasoline having a higher octane number.

When an additional binder (e.g., alumina sol) is used when producing the catalytic cracking catalyst, the catalytic cracking catalyst further includes a component derived from the additional binder (e.g., an oxide of an alumina sol).

The content of the zeolite having a sodalite cage structure, the content (on a $SiO_2$ basis) of silicon derived from a silica sol, the content (on an $Al_2O_3 \cdot 3P_2O_5$ basis) of phosphorus and aluminum derived from mono aluminum phosphate, the content of the clay mineral, and the content (on an oxide basis) of the rare-earth metal in the catalytic cracking catalyst produced using the production method according to one embodiment of the invention can be calculated from the amount of each raw material added when producing the catalyst.

The catalytic cracking catalyst produced using the production method according to one embodiment of the invention can be used for a fluid catalytic cracker and a batchwise catalytic cracker. The catalytic cracking catalyst can suitably be used for a fluid catalytic cracker.

The catalytic cracking catalyst produced using the production method according to one embodiment of the invention exhibits high cracking activity with respect to a heavy hydrocarbon oil, and can produce a gasoline fraction having a high octane number in high yield.

When subjecting a hydrocarbon oil to fluid catalytic cracking, it is possible to reduce the device cost and the operating cost required for fluid catalytic cracking, and reduce the load imposed on the device during operation (i.e., achieve stable operation) by improving the cracking activity even to a small extent.

Since a large amount of FCC gasoline is incorporated in commercial gasoline (gasoline shipped to the market), it is very advantageous to increase the octane number of FCC gasoline.

Since the catalytic cracking catalyst produced using the production method according to one embodiment of the invention exhibits high cracking activity with respect to a heavy hydrocarbon oil, and can produce a gasoline fraction (FCC gasoline) having a high octane number, the catalytic cracking catalyst is of practical value.

A catalytic cracking method that utilizes the catalytic cracking catalyst produced using the production method according to one embodiment of the invention is described below.

The catalytic cracking method that utilizes the catalytic cracking catalyst produced using the production method according to one embodiment of the invention may be implemented by bringing the catalytic cracking catalyst produced using the production method according to one embodiment of the invention into contact with a hydrocarbon oil (mixed hydrocarbon oil).

Examples of the hydrocarbon oil that is catalytically cracked using the catalytic cracking method include a hydrocarbon oil (hydrocarbon mixture) that boils at a temperature equal to or higher than the boiling point of gasoline.

Examples of the hydrocarbon oil that boils at a temperature equal to or higher than the boiling point of gasoline include one or more hydrocarbon oils selected from a light cycle oil, an atmospheric distillation residue, a vacuum distillation residue, and the like that are obtained by atmospheric or vacuum distillation of crude oil. Note that one or more hydrocarbon oils selected from a coker gas oil, a solvent deasphalted oil, asphalt obtained by solvent deasphalting, tar sand oil, shale oil, a coal-derived liquid, gas-to-liquids (GTL) oil, a vegetable oil, a used lubricating oil, a waste food oil, and the like may also be used. It is also possible to use a hydrotreated oil obtained by subjecting the hydrocarbon oil to a known hydrotreatment (i.e., hydrodesulfurization at a high temperature under high pressure in the presence of a hydrotreating catalyst (e.g., Ni—Mo-based catalyst, Co—Mo-based catalyst, Ni—Co—Mo-based catalyst, or Ni—W-based catalyst)).

The hydrocarbon oil may normally be catalytically cracked on a commercial scale by continuously circulating the catalytic cracking catalyst produced using the production method according to one embodiment of the invention through a catalytic cracker that includes a cracking reactor and a catalyst regenerator that are installed vertically.

Specifically, a high-temperature regenerated catalyst that is supplied from the catalyst regenerator is mixed with (brought into contact with) the hydrocarbon oil inside the cracking reactor to crack the hydrocarbon oil while guiding the catalyst upward inside the cracking reactor. The catalyst that has been deactivated by coke deposited on the surface of the catalyst as a result of catalytically cracking the hydrocarbon oil is separated from the cracking product, subjected to stripping, and supplied to the catalyst regenerator. The deactivated catalyst that has been supplied to the catalyst regenerator is regenerated by removing coke deposited on the catalyst through burning in air, and supplied to the cracking reactor.

The cracking product inside the cracking reactor that has been obtained by catalytic cracking is separated into one or more fractions such as dry gas, LPG, a gasoline fraction, LCO, HCO, and slurry oil. Part or all of LCO, HCO, slurry oil, and the like separated from the cracking product can be recirculated through the cracking reactor to effect a further cracking reaction.

The cracking reactor is preferably operated so that the reaction temperature is 400 to 600° C. (more preferably 450 to 550° C.), and the reaction pressure is normal pressure to 0.49 MPa (5 kg/cm$^2$) (more preferably normal pressure to 0.29 MPa (3 kg/cm$^2$). The mass ratio (g/g) (mass of catalytic cracking catalyst/mass of hydrocarbon oil) of the mass of the catalytic cracking catalyst to the mass of the hydrocarbon oil is preferably 2 to 20, and more preferably 4 to 15.

When the reaction temperature inside the cracking reactor is 400° C. or more, the cracking reaction of the hydrocarbon oil proceeds, and the cracking product can be advantageously obtained. When the reaction temperature inside the cracking reactor is 600° C. or less, the amount of light gas (e.g., dry gas and LPG) produced by cracking can be reduced, and the yield of the target gasoline fraction can be relatively increased (i.e., it is economical).

When the reaction pressure inside the cracking reactor is 0.49 MPa or less, the cracking reaction in which an increase in number of moles occurs is rarely hindered. When the mass ratio (g/g) (mass of catalytic cracking catalyst/mass of hydrocarbon oil) of the mass of the catalytic cracking catalyst to the mass of the hydrocarbon oil is 2 or more, the catalyst concentration in the cracking reactor can be appropriately maintained, and the cracking reaction of the hydrocarbon oil proceeds advantageously. When the mass ratio (g/g) (mass of catalytic cracking catalyst/mass of hydrocarbon oil) of the mass of the catalytic cracking catalyst to the mass of the hydrocarbon oil is 20 or less, the cracking reaction of the hydrocarbon oil effectively proceeds corresponding to an increase in catalyst concentration.

One embodiment of the invention can thus provide a method for catalytic cracking of a hydrocarbon oil using a catalyst for catalytic cracking of a hydrocarbon oil that can produce a gasoline fraction having a high octane number in high yield, and produce LPG having a high propylene content in high yield. The method for catalytic cracking of a hydrocarbon oil according to one embodiment of the invention can suitably be implemented as a hydrocarbon oil fluid catalytic cracking method.

One embodiment of the invention can provide a method that can easily produce a catalyst for catalytic cracking of a hydrocarbon oil that exhibits high cracking activity with respect to a heavy hydrocarbon oil, and can produce a gasoline fraction having a high octane number in higher yield.

Therefore, the method for catalytic cracking of a hydrocarbon oil can suitably be implemented using the catalytic cracking catalyst produced using the production method according to one embodiment of the invention.

EXAMPLES

The invention is further described below by way of examples. Note that the following examples are for illustration purposes only, and the invention is not limited to the following examples.

Production of Catalyst

In the following example and comparative examples, an ultra-stable Y zeolite having the properties shown in Table 1 was used as a zeolite having a sodalite cage structure, a silica sol having an SiO$_2$ concentration of 29.0 mass % was used as a silica sol, mono aluminum phosphate having an Al$_2$O$_3$.3P$_2$O$_5$ concentration of 46.2 mass % was used as mono aluminum phosphate, and kaolinite was used as a clay mineral.

TABLE I

| Silica/alumina ratio (molar ratio) | 7.0 |
|---|---|
| Unit cell dimension (nm) | 2.455 |
| Framework Al/total Al (molar ratio) | 0.77 |

Example 1

42.0 g (on a dry basis (SiO$_2$ basis)) of the silica sol was diluted with 25% sulfuric acid, and the dilution was stirred to obtain a silica sol aqueous solution. Separately, distilled water was added to 80.0 g (on a dry basis) of the ultra-stable Y zeolite having the properties shown in Table 1 to prepare a zeolite slurry. 76.0 g (on a dry basis) of kaolinite and the zeolite slurry were added to the silica sol aqueous solution. After the addition of 2.0 g (on a dry basis (Al$_2$O$_3$.3P$_2$O$_5$ basis)) of mono aluminum phosphate to the mixture, and the resulting mixture was stirred (mixed) for 10 minutes using a disperser to prepare an aqueous slurry (total amount of water: 714.3 ml, amount of solid: 200 g).

The aqueous slurry prepared as described above was transferred to a tank of a spray dryer, and allowed to stand at room temperature for 6 minutes in air (aging).

The aqueous slurry that had been aged was spray-dried in the spray dryer for 3 minutes (inlet temperature: 210° C., outlet temperature: 140° C.) to obtain microspheres (i.e., catalyst precursor). The microspheres were heated at 200° C. for 10 minutes under atmospheric pressure, subjected to an ion-exchange treatment twice using 3 L of a 5 mass % ammonium sulfate aqueous solution heated to 60° C., washed with 3 L of distilled water, and dried at 10° C. overnight inside a drier to obtain the target catalyst A.

Example 2

A catalyst B was produced in the same manner as in Example 1, except that the aqueous slurry was aged for 195 minutes.

Example 3

A catalyst C was produced in the same manner as in Example 1, except that the aqueous slurry was aged for 12 minutes.

Example 4

A catalyst D was produced in the same manner as in Example 1, except that the aqueous slurry was aged for 95 minutes.

Example 5

A catalyst E was produced in the same manner as in Example 1, except that the aqueous slurry was aged for 17 minutes.

Example 6

A catalyst F was produced in the same manner as in Example 1, except that the aqueous slurry was aged for 55 minutes.

Example 7

A catalyst G was produced in the same manner as in Example 1, except that the aqueous slurry was prepared by stirring the mixture for 5 minutes, and aged for 17 minutes.

Example 8

A catalyst H was produced in the same manner as in Example 1, except that the aqueous slurry was prepared by stirring the mixture for 2 minutes, and aged for 17 minutes.

Example 9

A catalyst I was produced in the same manner as in Example 6, except that the amount of the ultra-stable Y zeolite was changed from 80.0 g (on a dry basis) to 60.0 g (on a dry basis), and the amount of kaolinite was changed from 76.0 g (on a dry basis) to 96.0 g (on a dry basis).

Example 10

A catalyst J was produced in the same manner as in Example 6, except that the amount of mono aluminum phosphate was changed from 2.0 g (on a dry basis ($Al_2O_3 \cdot 3P_2O_5$ basis)) to 4.0 g (on a dry basis ($Al_2O_3 \cdot 3P_2O_5$ basis)), and the amount of kaolinite was changed from 76.0 g (on a dry basis) to 74.0 g (on a dry basis).

Comparative Example 1

A comparative catalyst 1 was produced in the same manner as in Example 1, except that the aqueous slurry was aged for 2 minutes.

Comparative Example 2

A comparative catalyst 2 was produced in the same manner as in Example 1, except that the aqueous slurry was aged for 250 minutes.

Comparative Example 3

A comparative catalyst 3 was produced in the same manner as in Example 9, except that the aqueous slurry was aged for 2 minutes.

Comparative Example 4

A comparative catalyst 4 was produced in the same manner as in Example 10, except that the aqueous slurry was aged for 2 minutes.

Table 2 shows the conditions employed when producing the catalysts A to J and the comparative catalysts 1 to 4.

In Table 2, the item "Y zeolite" indicates the content (on a dry basis) of the ultra-stable Y zeolite, the item "Silica sol" indicates the content (on a dry basis ($SiO_2$ basis)) of the silica sol, the item "Mono aluminum phosphate" indicates the content (on a dry basis ($Al_2O_3 \cdot 3P_2O_5$ basis)) of mono aluminum phosphate, and the item "Clay mineral" indicates the content (on a dry basis) of the clay mineral (kaolinite).

TABLE 2

| Catalyst | | | Example 1 Catalyst A | Example 2 Catalyst B | Example 3 Catalyst C | Example 4 Catalyst D | Example 5 Catalyst E | Example 6 Catalyst F |
|---|---|---|---|---|---|---|---|---|
| Stirring time when preparing aqueous slurry | | min | 10 | 10 | 10 | 10 | 10 | 10 |
| Content in aqueous slurry (on solid basis) | Y zeolite | mass % | 40 | 40 | 40 | 40 | 40 | 40 |
| | Mono aluminum phosphate (on $Al_2O_3 \cdot P_2O_5$ basis) | mass % | 1 | 1 | 1 | 1 | 1 | 1 |
| | Silica sol (on $SiO_2$ basis) | mass % | 21 | 21 | 21 | 21 | 21 | 21 |
| | Clay mineral | mass % | 38 | 38 | 38 | 38 | 38 | 38 |
| Aqueous slurry aging time | | min | 6 | 195 | 12 | 95 | 17 | 55 |

| Catalyst | | | Example 7 Catalyst G | Example 8 Catalyst H | Example 9 Catalyst I | Example 10 Catalyst J | Comparative Example 1 Comparative catalyst 1 |
|---|---|---|---|---|---|---|---|
| Stirring time when preparing aqueous slurry | | min | 5 | 2 | 10 | 10 | 10 |
| Content in aqueous slurry (on solid basis) | Y zeolite | mass % | 40 | 40 | 30 | 40 | 40 |
| | Mono aluminum phosphate (on $Al_2O_3 \cdot P_2O_5$ basis) | mass % | 1 | 1 | 1 | 2 | 1 |
| | Silica sol (on $SiO_2$ basis) | mass % | 21 | 21 | 21 | 21 | 21 |
| | Clay mineral | mass % | 38 | 38 | 48 | 37 | 38 |
| Aqueous slurry aging time | | min | 17 | 17 | 55 | 55 | 2 |

| Catalyst | | | Comparative Example 2 Comparative catalyst 2 | Comparative Example 3 Comparative catalyst 3 | Comparative Example 4 Comparative catalyst 4 |
|---|---|---|---|---|---|
| Stirring time when preparing aqueous slurry | | min | 10 | 10 | 10 |
| Content in aqueous slurry (on solid basis) | Y zeolite | mass % | 40 | 30 | 40 |
| | Mono aluminum phosphate (on $Al_2O_3 \cdot P_2O_5$ basis) | mass % | 1 | 1 | 2 |
| | Silica sol (on $SiO_2$ basis) | mass % | 21 | 21 | 21 |

TABLE 2-continued

| | | | | |
|---|---|---|---|---|
| Clay mineral | mass % | 38 | 48 | 37 |
| Aqueous slurry aging time | min | 250 | 2 | 2 |

Fluid Catalytic Cracking

An identical feedstock was subjected to fluid catalytic cracking under identical conditions using the catalytic cracking catalysts produced in Examples 1 to 10 and Comparative Examples 1 to 4 utilizing a bench-scale plant (i.e., a fluid catalytic cracker including a reaction vessel (cracking vessel) and a catalyst regenerator).

In order to simulate the actual usage state (equilibration), each of the catalytic cracking catalysts produced in Examples 1 to 10 and Comparative Examples 1 to 4 was dried at 500° C. for 5 hours, allowed to absorb a cyclohexane solution including nickel naphthenate and vanadium naphthenate so that the nickel content and the vanadium content in the catalytic cracking catalyst were respectively 1,000 mass ppm and 2,000 mass ppm, dried, calcined at 600° C. for 2 hours, and allowed to stand at 785° C. for 6 hours in a 100% water vapor atmosphere.

A hydrocarbon oil having the properties shown in Table 3 that was obtained by mixing 50 vol % of a desulfurized vacuum gas oil (VGO) and 50 vol % of a desulfurization residue (DDSP) was subjected to fluid catalytic cracking using each catalytic cracking catalyst under the reaction conditions shown in Table 4.

TABLE 3

| Oil | Desulfurized vacuum gas oil (VGO) (50 vol %) + desulfurization residue (DDSP) (50 vol %) |
|---|---|
| Density (15° C.) (g/cm$^3$) | 0.9032 |
| Kinematic viscosity (40° C.) (mm$^2$/s) | 67.06 |
| Residual carbon content (mass %) | 1.07 |
| Vacuum distillation properties | |
| Initial boiling point (° C.) | 305 |
| 10% distillation temperature (° C.) | 381 |
| 50% distillation temperature (° C.) | 457 |
| 95% distillation temperature (° C.) | 576 |
| End point (° C.) | — |

TABLE 4

| | |
|---|---|
| Reaction temperature (° C.) | 510 |
| Catalyst regeneration temperature (° C.) | 650 |
| Catalyst circulation amount (g/min) | 60 |
| Catalyst/feedstock (mass ratio) | 8 |

Results for Catalytic Cracking Reaction Achieved by Catalyst

The amounts (vol % and mass %) of a gasoline fraction (boiling point: 25 to 190° C.), a middle distillate (LCO (boiling point: 190 to 350° C.)), and a heavy distillate (boiling point: 350° C. or more) that were produced under the above cracking conditions were determined by a gas chromatography-distillation method using an analyzer ("AC Sumdis Analyzer" manufactured by Agilent Technologies).

Table 5 shows the yield (vol %) of gasoline (i.e., the content (vol %) of a gasoline fraction).

The conversion ratio (mass %) when catalyst/raw material oil (mass ratio)=8 was calculated based on the measurement results using the following expression. The results are shown in Table 5.

Conversion ratio (mass %)=100 (mass %)−LCO content (mass %)−heavy distillate content (mass %)

The research octane number (RON) (GC-RON based on gas chromatography) of the gasoline fraction was calculated using an analyzer ("PONA analyzer" manufactured by Hewlett-Packard Company). The results are shown in Table 5.

TABLE 5

| | Example 1 Catalyst A | Example 2 Catalyst B | Example 3 Catalyst C | Example 4 Catalyst D | Example 5 Catalyst E | Example 6 Catalyst F | Example 7 Catalyst G | Example 8 Catalyst H |
|---|---|---|---|---|---|---|---|---|
| Conersion ratio (%) | 65.6 | 65.4 | 66.1 | 66.0 | 66.5 | 66.6 | 66.2 | 65.9 |
| Yield (vol %) of gasoline fraction | 48.2 | 48.1 | 48.6 | 48.5 | 49.0 | 49.1 | 48.7 | 48.4 |
| Octane number | 90.4 | 90.4 | 90.4 | 90.5 | 90.5 | 90.6 | 90.4 | 90.4 |

| | Example 9 Catalyst I | Example 10 Catalyst J | Comparative Example 1 Comparative catalyst 1 | Comparative Example 2 Comparative catalyst 2 | Comparative Example 3 Comparative catalyst 3 | Comparative Example 4 Comparative catalyst 4 |
|---|---|---|---|---|---|---|
| Conversion ratio (%) | 61.6 | 67.2 | 65.0 | 64.8 | 60.0 | 65.4 |
| Yield (vol %) of gasoline fraction | 48.7 | 49.5 | 47.8 | 47.7 | 42.8 | 47.5 |
| Octane number | 90.4 | 90.5 | 90.2 | 90.1 | 90.0 | 89.8 |

In Examples 1 to 10 in which the aqueous slurry including specific amounts of the zeolite having a sodalite cage structure, the silica sol, mono aluminum phosphate, and the clay mineral was aged for 5 to 200 minutes, and spray-dried to produce the catalytic cracking catalyst, the conversion ratio was as high as 61.6 to 67.2 mass %, the yield of the gasoline fraction was as high as 48.1 to 49.5 vol %, and the octane number (RON) of the gasoline fraction was as high as 90.4 to 90.6 (see Tables 2 and 5).

In Comparative Examples 1, 3, and 4 in which the aging time was as short as 2 minutes, and Comparative Example 2 in which the aging time was as long as 250 minutes, the conversion ratio was as low as 60.0 to 65.4 mass %, the yield of the gasoline fraction was as low as 42.8 to 47.8 vol %, and the octane number of the gasoline fraction was as low as 89.8 to 90.2 (see Tables 2 and 5).

It was thus confirmed that it is possible to easily produce a catalyst for catalytic cracking of a hydrocarbon oil that exhibits high cracking activity with respect to a heavy hydrocarbon oil, and can produce a gasoline fraction having a high octane number in high yield by employing the conditions (methods) employed in Examples 1 to 10.

INDUSTRIAL APPLICABILITY

The embodiments of the invention can thus provide a method that can easily produce a catalyst for catalytic cracking of a hydrocarbon oil that exhibits high cracking activity with respect to a heavy hydrocarbon oil, and can produce a gasoline fraction having a high octane number in high yield.

The invention claimed is:

1. A method for producing a catalyst for catalytic cracking of a hydrocarbon oil comprising preparing an aqueous slurry that comprises 20 to 50 mass % of a zeolite having a sodalite cage structure, 10 to 30 mass % (on a $SiO_2$ basis) of a silica sol, 0.1 to 21 mass % (on an $Al_2O_3.3P_2O_5$ basis) of mono aluminum phosphate, and 5 to 65 mass % of a clay mineral on a solid basis, aging the aqueous slurry for 5 to 200 minutes, and spray-drying the aqueous slurry.

* * * * *